Nov. 4, 1952  O. D. MELKON  2,616,634
FILM MAGAZINE

Filed April 1, 1949  2 SHEETS—SHEET 1

Inventor:
Onnig D. Melkon,
by Thomson & Thomson
Attorneys

Nov. 4, 1952 — O. D. MELKON — 2,616,634
FILM MAGAZINE

Filed April 1, 1949 — 2 SHEETS—SHEET 2

Inventor
Onnig D. Melkon,
by Thomson & Thomson
Attorneys

Patented Nov. 4, 1952

2,616,634

UNITED STATES PATENT OFFICE 2,616,634

FILM MAGAZINE

Onnig Diran Melkon, South Weymouth, Mass.

Application April 1, 1949, Serial No. 84,913

3 Claims. (Cl. 242—74)

1

This invention relates to film magazines, and pertains more particularly to improvements in magazines for standard motion picture camera film of the conventional 8 mm., 16 mm., or 35 mm. sizes commonly used by amateur or professional photographers in portable motion picture cameras.

Heretofore, the sensitized, unexposed film for such cameras has been supplied to the user on metal reels, in lengths of fifty or one hundred feet for so-called daylight loading. The film has end leaders of non-sensitized material which normally surrounds the sensitized portion of the rolled film and is intended to protect the latter from becoming light struck or fogged during the loading of the film in the camera, the leader being attached to a take-up reel and fed through the sprockets and film gate, and the camera being closed before the leader is fully unwound from the feed reel in the camera. The opposite end of such film has a trailer strip which encircles the roll of exposed film on the take-up reel. Nevertheless, a portion of the sensitized film is frequently light struck or partially fogged in loading or unloading the conventional film reels, particularly when the film is not tightly wound on the reels; and, if it is desired to change the film in daylight before the entire reel has been exposed and wound on the take-up reel, it is inevitable that a substantial portion (twelve feet or more) of the exposed and unexposed film will be light struck or fogged during the operation of removing the film from the camera. The same condition obtains whenever it becomes necessary to open the camera in order to make adjustments of the mechanism, for the light will strike through several turns of the film on both the feed reel and the take-up reel, as well as the intervening portion of the film, inasmuch as the conventional reels are not enclosed.

It is accordingly the principal purpose of this invention to provide a closed and substantially light-tight film magazine which may be used in any standard motion picture camera utilizing 8 mm., 16 mm., or 35 mm. film, both as a feed reel and a take-up reel, which will effectively prevent that portion of the film within the magazine from becoming light struck or fogged when the camera is loaded or unloading or when the camera case is opened before all of the film is exposed, either to make adjustments of the mechanism or to remove and replace the magazine therein, and which provides means for inserting and winding a film end on the take-up reel or spool while the magazine is closed.

2

Another object of the invention is to provide a take-up magazine having a spool equipped with a spring device for automatically gripping and winding the pick-up end of a film strip inserted through a light-tight port or opening of the closed magazine, either before or after it is placed on the winding spindle of the camera; such spool being also usable in the feed magazine, if desired. By this means, the film end is automatically attached to and partially wound on the spool, without opening the magazine.

A further object of the invention is to provide a film magazine of the type aforesaid, having locating studs or pins on its base, and to provide an adapter plate having openings to receive said pins and other openings or recesses for receiving the studs or projections of conventional motion picture camera cases, whereby the inserted magazine is held in stationary and correct position within the camera. Individual adapter plates may be designed to fit all standard magazines of cameras.

Additional objects and advantages of this invention will become apparent from the following description of the recommended embodiment of the invention shown in the accompanying drawings, and will be pointed out in the appended claims. It will be understood, however, that the size, shape and structural details of the devices herein illustrated and described may be varied to suit particular conditions without departing from the essence of this invention, as set forth in said claims. In the drawings, Fig. 1 is a plan view of a closed, film magazine made in accordance with this invention;

Figure 5:
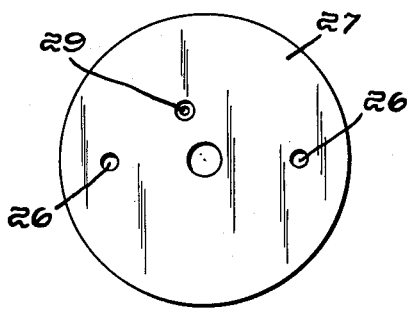
Figure 6:
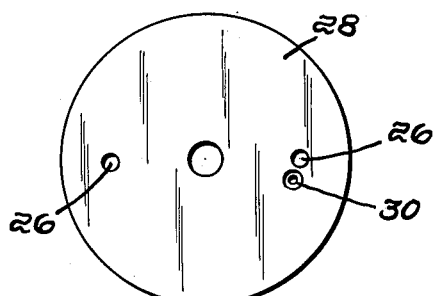

Figs. 5 and 6 are bottom views of adapter plates designed for association with the take-up magazine and the feed magazine, respectively, of one standard type of motion picture camera; and Figs. 7 to 10 inclusive are diagrammatic views of the improved film pick-up spool and the magazine ports, progressively illustrating the manner in which a film end inserted through one of such ports is gripped by the spool spring and partially wound on the spool.

In the particular form chosen for the purpose of illustration, the improved magazine comprises a circular base or receptacle part 11, a removable cover 12 having a peripheral flange 13, and a pick-up spool 14 equipped with the film-gripping spring 15. The base and cover may be made of molded plastic material, light metal, or the like; and the spool may be of plastic, metal, or wood.

The upstanding wall of the base 11 is formed at its top with an exterior annular groove 16 and interior flange 17, the groove receiving the flange 13 of the cover which fits closely against the flange 17 of the base and provides a light-tight joint. Both the base and the cover are provided with central, annular ribs or flanges 18 and 19, respectively, which surround axial openings therethrough and which are received within annular grooves in the respective ends of the spool 15 to locate the spool and provide light-tight rotational bearings therefor when the magazine is closed. The spool has the usual axial opening 20 of non-circular cross-section, to receive the film-winding spindle of the motion picture camera in which the magazine is used.

The side wall of the base member 11 has at least one, and preferably two, vertical slots therethrough, constituting film ports 20 and 21, and the wall surfaces in and adjacent said ports are covered with strips of soft felt 22 or other suitable material, so that the ports are lightproof and so that the film will slide easily therethrough, in accordance with common practice. The flange 13 of the cover 12 has a notch or recess 23 which receives an upstanding locking portion 24 of the base wall, adjacent the ports to provide a tight seal at that region and to prevent rotation of the cover.

The bottom of the receptacle 11 is provided with a pair of diametrically opposite locating pins 25. Said pins are receivable in complemental openings 26 of either of the adapter plates 27 and 28 shown in Figs. 5 and 6, respectively. The adapter plates are relatively thin, circular pieces of plastic, metal or wood and are designed respectively to fit a particular camera, beneath the take-up magazine and the feed magazine inserted therein. In the form shown in Figs. 5 and 6, the take-up adapter 27 has a bottom recess 29 adapted to receive a stud or projection forming part of a particular camera case adjacent the take-up spindle thereof, and the plate 28 has a bottom recess 30 adapted to receive a stud or projection adjacent the feed spindle of the same camera case. As previously indicated, the adapter plates are provided with recesses or openings so located as to fit the studs or projections of each of the several standard motion picture cameras. In some cases, the adapters would have more than one recess or opening for this purpose. When applied to the camera case over the respective spindles which pass through the central openings of said plates, the respective adapter plates are thus held against rotation, and the respective film magazines are also held against rotation on the spindle by fitting the locating pins 25 in the adapter openings 26, the latter openings being in the same relative position in all styles of adapters. Hence, each magazine is supported in stationary position for the correct feeding or take-up of the film, when the adapter plates are properly located in the particular camera.

After loading the feed magazine with film wound on the spool 14, and closing the cover, the exterior joint between the receptacle 11 and the cover 12 is preferably sealed with a piece of adhesive tape, a portion of the film leader projecting through the feed port of the magazine and being held by the tape. If desired, the feed port of the magazine, which may be the port 21, may be slightly wider than the take-up port 20, so that the film will feed more easily when the camera is in operation, to wind the film on the spool of the take-up magazine.

Figure 1:
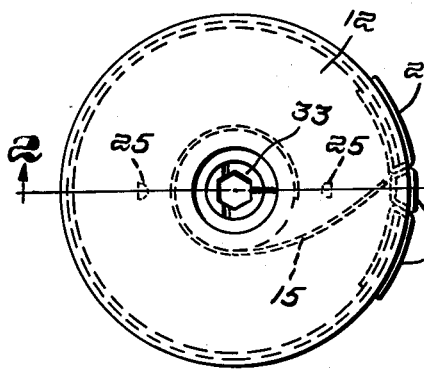
Figure 2:
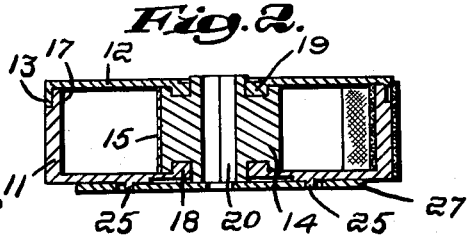
Fig. 2 is a section on line 2—2 of Fig. 1.
Figure 3:
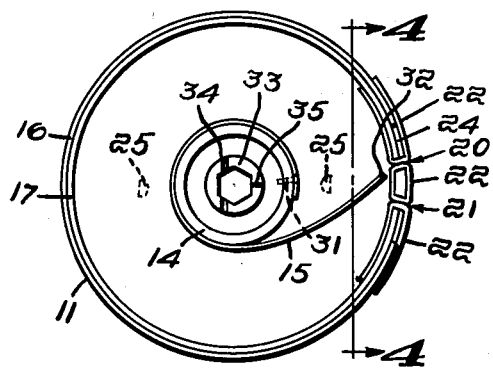
Fig. 3 is a plan view of the magazine of Fig. 1 with the cover thereof removed.
Figure 4:
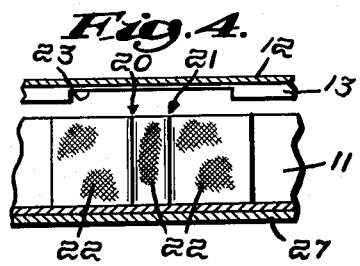
Fig. 4 is a fragmentary section on line 4—4 of Fig. 3, also showing a portion of the magazine cover in position to be placed on the base or receptacle portion of the magazine.

As a particular feature of this invention, the spool 14 of the take-up magazine is equipped with an automatic film pick-up device, preferably the spring 15 consisting of a thin, elongate strip of resilient metal, having a width no greater than the thickness of the spool 14. One end of the spring is fastened to the spool, preferably by one or more counter-sunk screws 31 (Fig. 3); the central portion of the spring is coiled part way around the spool; and the opposite end of the spring extends outwardly from the spool and terminates at 32 short of the side wall of the receptacle 11 and adjacent one side of the feed port 20, when the spool is turned to position for receiving a film end inserted through said port. For this purpose, the spool may be turned by hand or by a suitable key, inasmuch as its hub 33 is accessible through the central opening in the top of the cover 12. Said hub may have grooves, notches, recesses or markings as indicated at 34 and 35, to indicate the normal position of the spring with respect to the spool, and the cover 12 may have complemental markings, if desired. The notches or recesses 34 may be shaped to receive the prongs of a key employed for manually rotating the spool. When a film end is to be engaged by the take-up spool, the spool is first manually rotated to the approximate position shown in Fig. 3.

Figure 7:
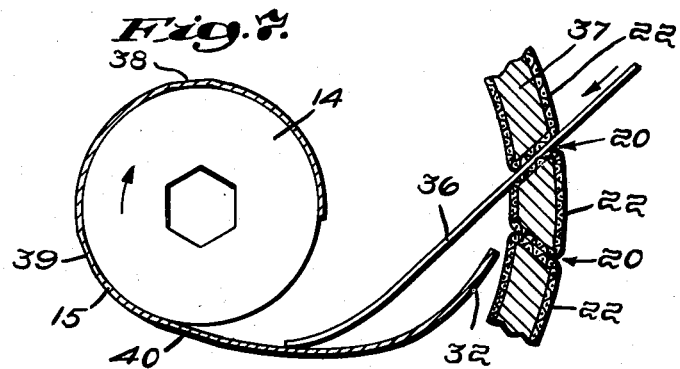
Figure 8:
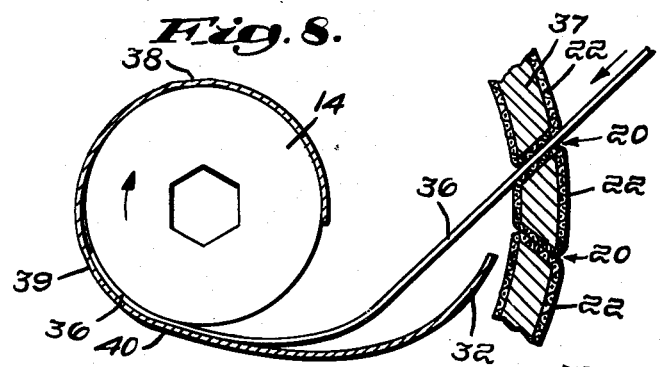

The insertion of the film end 36 through the port 20 which, as best shown in Figs. 7 to 10, is angularly inclined with respect to the wall 37 of the receptacle 11, causes the film to strike the inner side of the spring extension 32, and slide along said inner side (Fig. 7) until it is frictionally gripped between the spring and the spool (Fig. 8), by pushing the film end further through the port 20. In order that the spring may properly guide and grip the film end as aforesaid, the spring is preferably tempered to provide flat portions at the regions 38, 39 and 40, as shown in Fig. 7. The forceful insertion of the film end will thus tend to spread the spring away from the spool surface at 40, until the film tip reaches the flat portion 39 where it is initially gripped.

Figure 9:
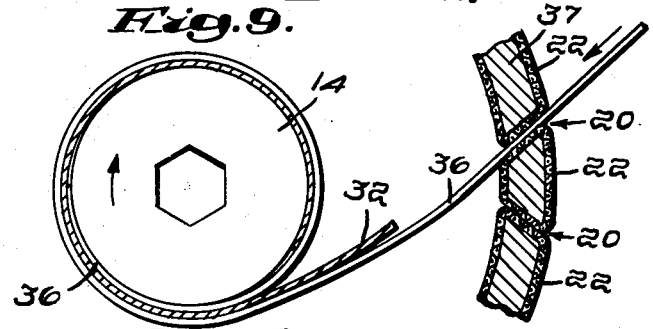
Figure 10:
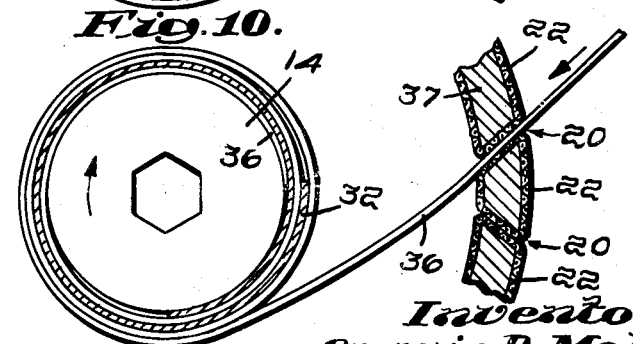

The spool may then be rotated by the camera winding spindle, so that the film end is drawn around the spool and tightly wound thereon, coiling the flexible spring end 32 between the coils of the film (Figs. 9 and 10). After the film end has been firmly engaged and partially wound, as shown in Fig. 10, the camera case may be closed, and the camera is operated in a conventional manner. The manual insertion of about six inches of the film end will ordinarily suffice to cause the spring to grip the end against the spool. The film end may be straightened if desired prior to insertion, to take out the curl and permit more rapid insertion and locking by the spring. As previously stated, the film may be of 8 mm., 16 mm., or 35 mm. in lengths of fifty or one hundred feet; and it may be black and white or color film of any standard type.

A film magazine of the general construction herein described will protect the enclosed film from accidental exposure or fogging from the time the feed magazine is packed until the film in the take-up magazine is ready for processing, and only such portion of the film as may extend between the two magazines in a loaded camera can become light struck if the camera cover is opened. It will be understood that the side of the closed take-up magazine would be sealed with tape, as aforesaid, before it is placed on the winding spindle to receive the end of the leader of the film drawn from the feed magazine, and that the sealing tape would remain in place until the exposed film is to be processed.

The provision of the adapter plate not only holds both magazines stationary within the camera but also prevents tilting or wobbling of the magazine or the film therein. The cover of the magazine is grooved around its central opening to receive a guide member conventionally embodied on the inside of the camera cover, thereby to assist the adapter in preventing wobbling of the magazine. The adapter plates may be permanently secured in the camera case, for they will not interfere with the use of standard reels.

The magazine is constructed to correspond in size to the standard spools or reels which holds the same amount of coiled film. When the magazine is placed in the camera, the bottom of the spool will rest on the conventional spindle bed, and the spool may be of such thickness that the magazine base will drop slightly lower than the spindle bed, so that the spool is free to turn without touching the top or bottom of the closed magazine to ensure easy winding or unwinding of the film. The film ports are so located that the film feeds properly through the sprockets of the winding mechanism while the camera is in operation. If it becomes desirable to open the camera cover to adjust the mechanism or to remove and replace the partially exposed film in daylight, only the length of film extending between the two magazines—usually less than a foot—becomes light struck, as contrasted with the length of film—usually twelve feet or more—which would become light struck or fogged when a camera containing the standard or conventional reels is opened for such purposes.

I claim:

1. A film magazine for motion picture cameras, comprising a base member and a removable cover member, the side wall of the closed magazine having at least one film port, a film spool removably and rotatably mounted within the magazine, and a film-gripping spring member partially encircling said spool, one end of the spring member being fixed to the spool and the opposite end thereof being free and, when the magazine is empty, normally extending outwardly of the spool and terminating short of said side wall, said free spring end being movable by manually rotating the spool to a position adjacent said film port, whereby a film end manually inserted through the port of the closed magazine will engage and slide along the inner side of the spring to gripped position between the spring and spool.

2. A film magazine for motion picture cameras, comprising a base member and a removable cover member, the side wall of the closed magazine having at least one film port, a film spool removably and rotatably mounted within the magazine, and a film-gripping spring member partially encircling said spool, one end of the spring member being fixed to the spool and the opposite end thereof being free and, when the magazine is empty, normally extending outwardly of the spool and terminating short of said side wall, said free spring end being movable by manually rotating the spool to a position adjacent said film port, whereby a film end manually inserted through the port of the closed magazine will engage and slide along the inner side of the spring to gripped position between the spring and spool, said spring member consisting of a partially coiled strip of resilient metal.

3. A film magazine for motion picture cameras, comprising a base member and a removable cover member, the side wall of the closed magazine having at least one film port, a film spool removably and rotatably mounted within the magazine, and a film-gripping spring member partially encircling said spool, one end of the spring member being fixed to the spool and the opposite end thereof being free and, when the magazine is empty, normally extending outwardly of the spool and terminating short of said side wall, said free spring end being movable by manually rotating the spool to a position adjacent said film port, whereby a film end manually inserted through the port of the closed magazine will engage and slide along the inner side of the spring to gripped position between the spring and spool, said spring member consisting of a partially coiled strip of resilient metal and having at least one tempered flat region in the portion encircling the spool.

ONNIG DIRAN MELKON.

REFERENCES CITED

The following references are of record in the file of this patent:

UNITED STATES PATENTS

| Number | Name | Date |
|---|---|---|
| 1,137,771 | Mandel | May 4, 1915 |
| 1,164,835 | Mandel | Dec. 21, 1915 |
| 1,403,522 | Pittman | Jan. 17, 1922 |
| 1,899,279 | Lessler | Feb. 28, 1933 |
| 1,966,347 | Hughey | July 10, 1934 |
| 2,032,214 | Howell | Feb. 25, 1936 |
| 2,135,026 | Becker | Nov. 1, 1938 |
| 2,184,331 | Becker et al. | Dec. 26, 1939 |
| 2,422,635 | Steiner | June 17, 1947 |

FOREIGN PATENTS

| Number | Country | Date |
|---|---|---|
| 2,895 | Australia | Sept. 23, 1931 |
| 150,742 | Austria | Sept. 25, 1937 |